INVENTORS
LOUIS S. GUARINO
ALAN S. CORSON

ATTORNEY

Dec. 25, 1962   L. S. GUARINO ET AL   3,070,793
AUTOMATIC INTEGRATED DIRECTOR EQUIPMENT
Filed Aug. 1, 1961   4 Sheets-Sheet 3

INVENTORS
LOUIS S. GUARINO
ALAN S. CORSON
BY
ATTORNEY

B — LOCATION OF INTERCEPTOR
A — LOCATION OF TARGET
R — INSTANTANEOUS DISTANCE "A to B"
θ — INSTANTANEOUS ANGLE "A to B"
β — TARGET HEADING
Ċ — TARGET SPEED
Ġ — INTERCEPTOR SPEED
η — COMMAND HEADING TO INTERCEPT
O — INTERCEPT POINT
C — TARGET DISTANCE TO "O"
G — INTERCEPTOR DISTANCE TO "O"
$t_o$ — TIME TO INTERCEPT

3,070,793
AUTOMATIC INTEGRATED DIRECTOR EQUIPMENT
Louis S. Guarino, Hatboro, and Alan S. Corson, Levittown, Pa., assignors to the United States of America as represented by the Secretary of the Navy
Filed Aug. 1, 1961, Ser. No. 128,599
9 Claims. (Cl. 343—7)
(Granted under Title 35, U.S. Code (1952), sec. 266)

The invention described herein may be manufactured and used by the Government of the United States of America for governmental purposes without the payment of any royalties thereon or therefor.

This invention relates to aircraft computer-display systems, and more particularly to a computer-display system for presenting a pilot with necessary situation and command displays for the completion of a specified mission.

In the field of aircraft instrumentation it has been the general practice to employ a separate meter and sensing system for each situation or command display necessary to a pilot on a specific mission. When in the development of high performance aircraft, it became necessary to provide the pilot with additional situation and command information, it was customary to add one more meter or indicator on the panel in front of the pilot with additional sensing and computing devices to supply the necessary information to the meter. With each additional meter the pilot was faced with the increasingly complex job of assimilating more and more indicated information in an extremely short time. As a result judgments or tactical decisions were often inaccurate and resulted in aborted missions.

The present invention contemplates a computer-display system for use in an interceptor aircraft wherein the various command and situation displays are integrated to provide an easily assimilated presentation for the pilot. Whereas, in the past separate groups of indicators were required for each flight mode of the aircraft, the present invention utilizes the same set of indicators regardless of the flight mode in which the aircraft happens to be. Further, many of the indicators of the present invention are multifunctioned and display several types of data. Such a system is feasible since certain flight situations call for the same control regardless of the mode of flight. Thus, whether the aircraft is in an intercept mode to an intercept point of a moving target or whether the aircraft is in a dead reckoning mode to a fixed target, the same indicator may be used to display control instructions to the pilot.

An attack aircraft on a mission may be flying in one of two major flight modes. First, the aircraft may be flying to a fixed target the position of which is known before the actual flight is underway or, as in some cases, after takeoff of the aircraft. The second major mode in which an aircraft may be flying is called the intercept mode. In this mode, the attack aircraft is actually flying to a point of interception with a moving target. Obviously, the aircraft cannot be flying in both modes at once. Consequently it is feasible to use for both modes the same group or set of indicators by which a pilot is advised of his situation with respect to a target and also receives proper commands to fly to the target or point of interception.

Some meters indicate a situation continuously without regard to which mode the aircraft is flying in as, for example, the angle of attack of the aircraft is indicated at all times regardless of the flight mode of the aircraft. Also the altitude of the aircraft is indicated at all times without regard to the flight mode in which the aircraft happens to be. The heading, roll and pitch of the aircraft are indicated continuously without respect to which mode the aircraft actually is flying. However, some situation displays and all command displays are functions of the particular mode in which the attack aircraft happens to be flying.

Therefore, it is an object of the present invention to provide an instrumentation system which is integrated with regard to the command and situation display units or meters, as well as in regard to the actual computing apparatus associated therewith.

It is another object of the present invention to provide automatic integrated director equipment wherein a minimum number of situation and command display units or meters is used to provide a pilot with all the necessary information to carry out a specified mission, whether it be in dead reckoning to a fixed target or base, or to the intercept point of a moving target.

Yet another object of the present invention is to provide automatic integrated director equipment in which several display units are integrated to perform dual functions and also in which the same meters are used to indicate the same type information for each of the various flight modes.

A still further object of the present invention is to provide an instrumentation system wherein flight commands to the pilot are presented on the same meters regardless of the specific mode in which the aircraft may be flying.

A still further object of the present invention is to provide an instrumentation system for automatic integrated director equipment in which the various computing elements are interrelated and integrated to provide a simple display system easily adapted to supply information to a limited number of display units.

Other objects and many of the attendant advantages of this invention will be readily appreciated as the same become better understood by reference to the following detailed description when considered in connection with the accompanying drawing.

The present invention comprises four computer sub-systems to be described individually. The manner in which the computer sub-systems are interrelated will become apparent as the various display units are related to the computer sub-systems as the specification develops.

Figure 1A:
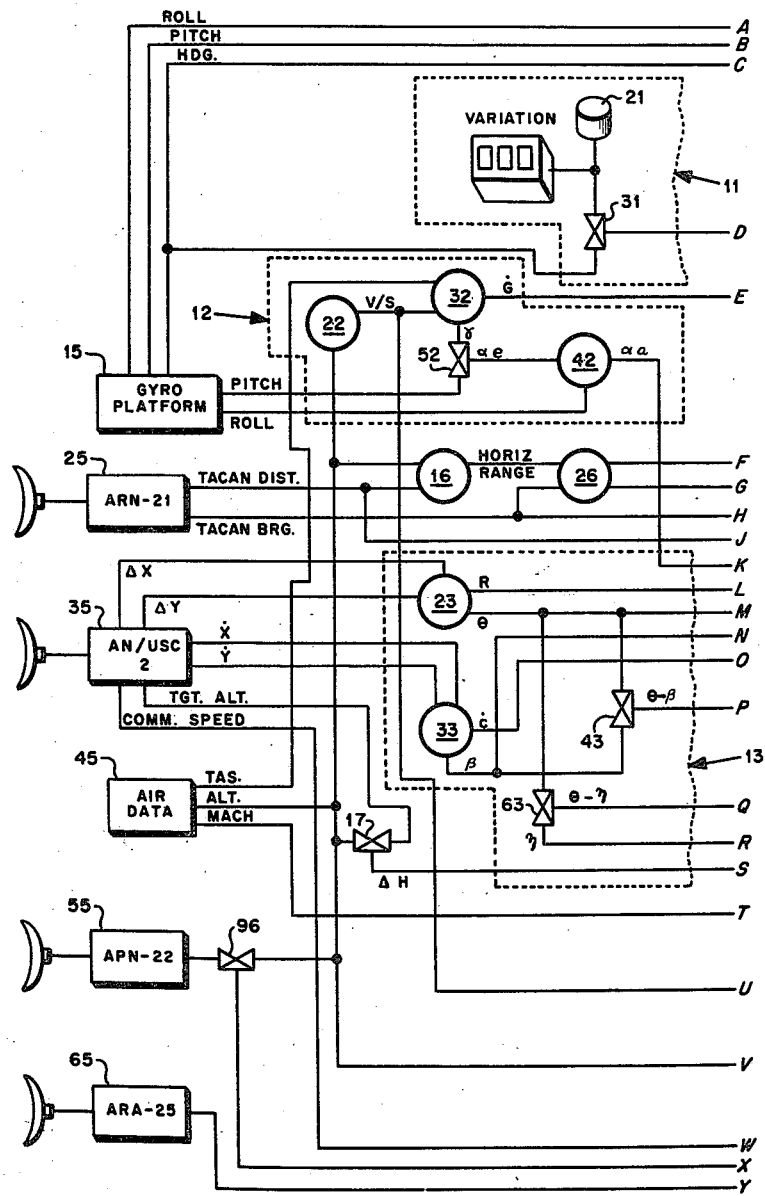
FIGURES 1a, 1b and 1c show in block diagram form the preferred embodiment of the present invention.
Figure 1B:
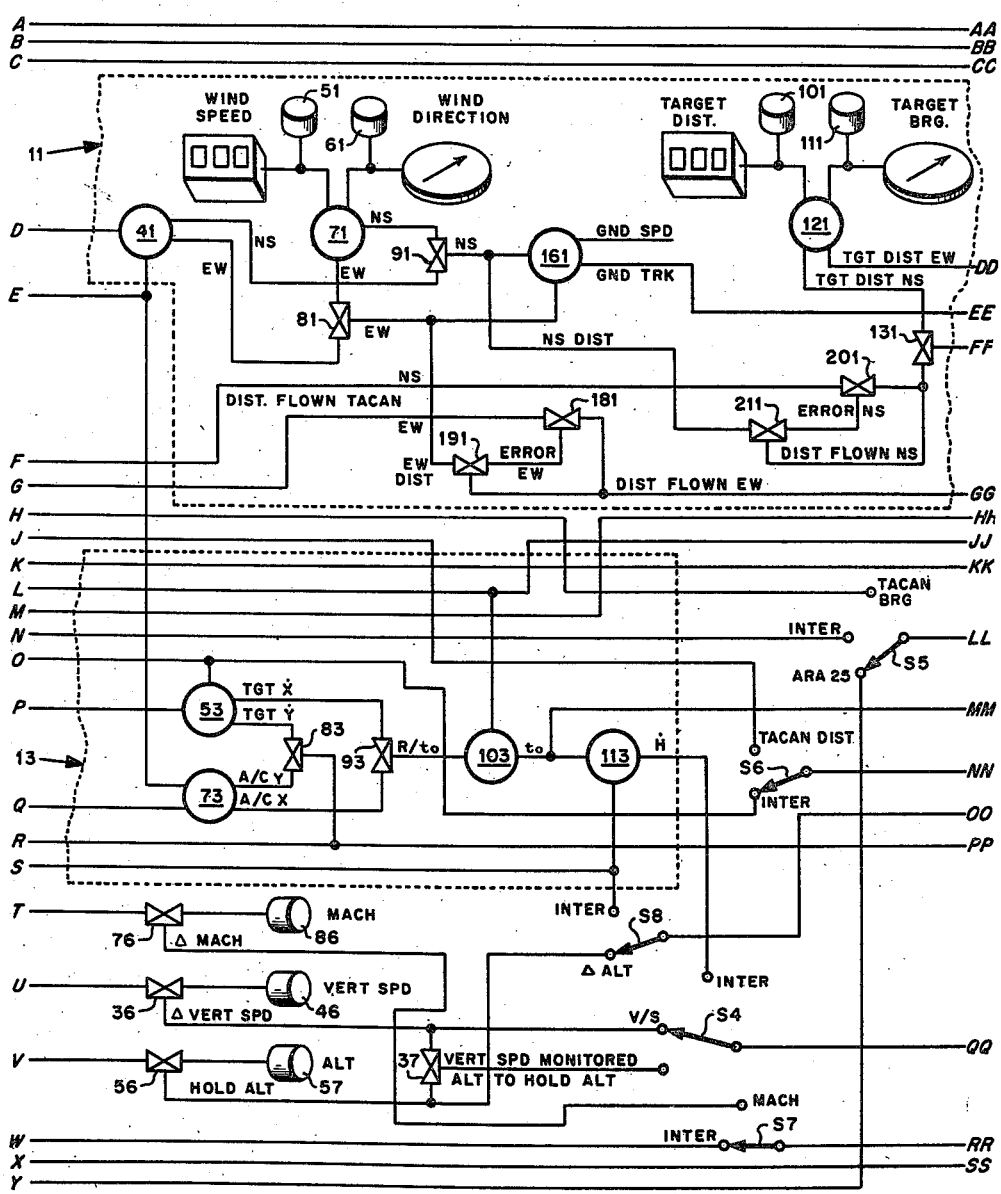
Figure 1C:
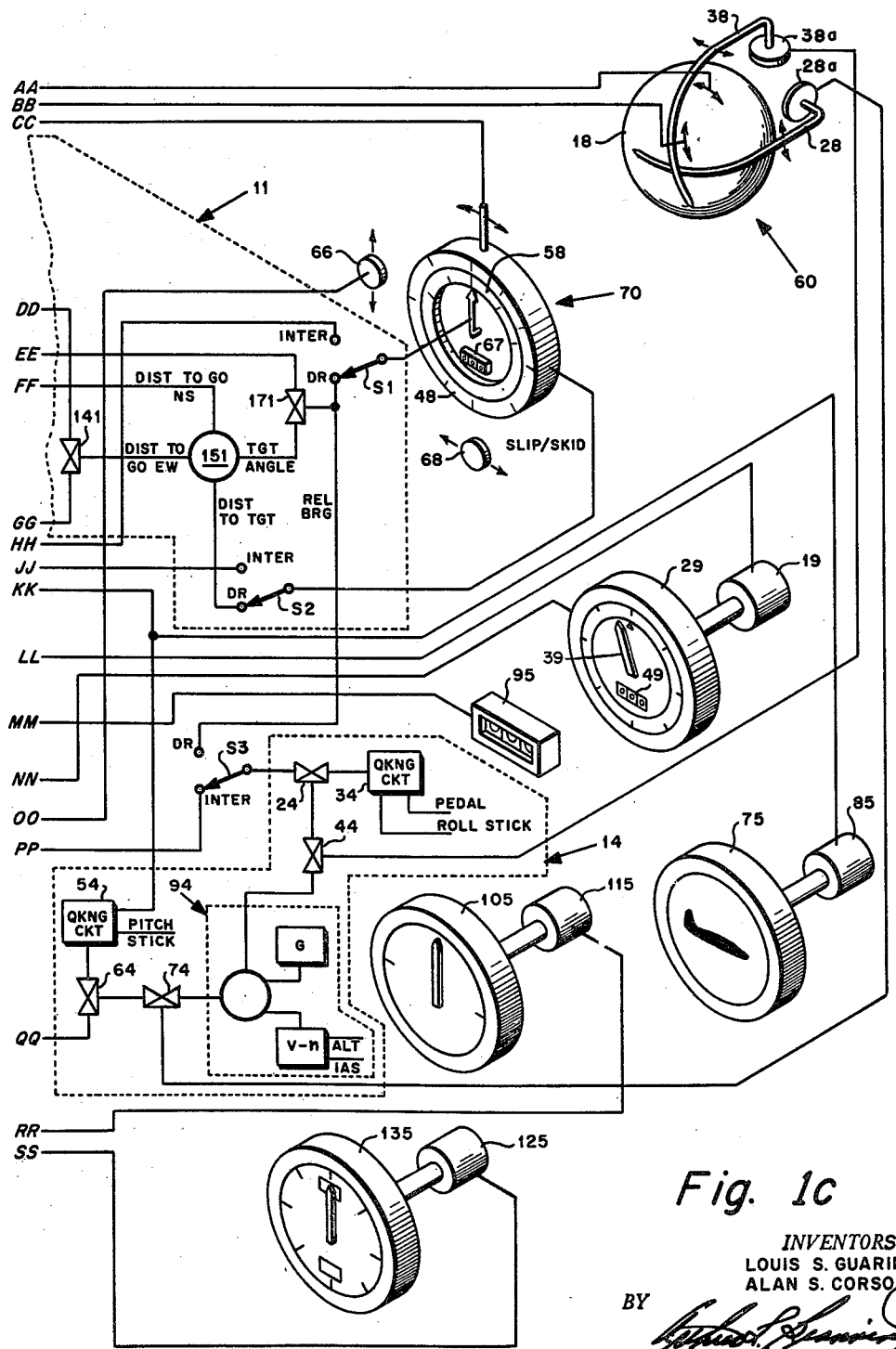

Referring now to FIGS. 1a, 1b, and 1c it is seen that the system of the present invention comprises four computer sub-systems. The dead reckoning navigation computer with TACAN tie-in is enclosed by dotted line 11. The angle of attack computer is enclosed by dotted line 12. The intercept computer is enclosed by dotted line 13. The command computer is enclosed by dotted line 14.

It should be noted that the angle of attack computer 12 and the command computer 14 are continuously in operation regardless of the particular flight mode of the interceptor. The dead reckoning navigation computer with TACAN tie-in is operated during the flight mode when the interceptor is flying toward a fixed target or back to base. On the other hand, the intercept computer is in operation when the interceptor is in the intercept mode in which it is flying to an intercept point with a moving target.

The angle of attack computer 12 which forms the subject matter of application Serial No. 862,724 of Alan S. Corson et al. for Angle of Attack Computer, filed December 29, 1959, comprises differentiator 22, resolver units 32 and 42, and differential unit 52. The angle of attack computer receives four separate inputs, two of which are proportional to pitch and roll of the aircraft. These pitch and roll inputs are received as outputs from gyro platform 15 which also generates a third output proportional to yaw or heading of the interceptor. The other two inputs to the angle of attack computer 12 are true airspeed and altitude of the interceptor which are received from air data computer 45. The altitude signal from air data computer 45 is fed directly to differentiator 22 which has an output proportional to the vertical speed of the interceptor. This output is provided as a first input to resolver unit 32 which receives the true airspeed signal from air data computer 45 as a second input. The resolver 32 has two outputs which are respectively proportional to interceptor speed $\dot{G}$ and flight path angle $\alpha$ of the interceptor. The output proportional to the flight path angle $\alpha$ is provided as one input to differential unit 52 where it is subtracted from the input proportional to pitch to provide an output $\alpha e$ which is the angle of attack relative to earth coordinates. The output $\alpha e$ proportional to angle of attack is fed as an input to the resolver 42 which has a second input proportional to the roll of the interceptor. The second resolver 42 functions to divide the angle of attack earth coordinates $\alpha e$ by the cosine of the interceptor bank angle. The output of resolver unit 42 is therefore the angle of attack $\alpha a$ of the interceptor with respect to the interceptor's coordinates. The angle of attack output $\alpha a$ is fed as an input to angle of attack indicator 75 to be discussed further hereinbelow. As previously mentioned, the angle of attack computer has a second output which is proportional to the interceptor speed G. This output serves as an input to the dead reckoning navigation computer 11 and also to the interceptor computer 13, as will be more fully discussed hereinbelow. Thus, it is seen that although the angle of attack computer functions independently to provide angle of attack information to the pilot, it is also an integral part of the whole system.

The dead reckoning navigation computer with TACAN tie-in 11 is used in the mode wherein the interceptor is flown to a fixed target and wherein the situation display and command display necessary to guide the interceptor to that fixed target receive the outputs from the dead reckoning navigation computer 11.

Differential 31 receives as an input from gyro platform 15 the heading or yaw of the interceptor aircraft. Differential unit 31 has a second input which is manually inserted as by knurled knob 21 which compensates for the error introduced into the heading information caused by magnetic north. Therefore, differential unit 31 has an output which is a corrected version of the heading of the interceptor in flight. This output is fed into a conventional type electromechanical resolver 41. Resolver 41 also receives as an input the interceptor speed $\dot{G}$ output of angle of attack computer 11. The resolver 41 resolves these inputs into N—S and E—W components of interceptor velocity.

Dead reckoning navigation computer 11 further has means for manually inserting therein known values of wind speed and wind direction. This is done by means of knurled knobs 51 and 61 which position the movable elements of resolver 71 accordingly. Resolver unit 71 provides outputs of wind velocity resolved in a N—S, E—W direction, respectively. The N—S component of interceptor velocity from resolver 41 is added to the N—S component of wind velocity from resolver 71 in differential unit 91. Likewise, the E—W component of interceptor velocity from resolver 41 is added to the E—W component of wind velocity from resolver 71 in differential unit 81. Each of units 81 and 91 also contain integrating equipment to convert velocity into distance traveled. Thus, the output from differential unit 81 is representative of the distance flown by the interceptor in an E—W direction. The output from differential unit 91 is representative of the distance flown by the interceptor in a N—S direction. The distance from base to target and the bearing from base to target is inserted into the dead reckoning navigation computer 11 by means of knurled knobs 101 and 111 by accordingly rotating the movable element of resolver 121 in which the distance to the target is resolved into E—W and N—S components and which accordingly has outputs proportional thereto. The actual distance flown in N—S direction is subtracted from the N—S distance from base to target in differential unit 131 which has an output proportional to the distance-to-go to the target in the N—S direction. The distance flown in an E—W direction is subtracted from the distance from base to the target in the E—W direction in differential unit 141 which accordingly has an output proportional to distance-to-go to the target in the E—W direction.

The outputs from differential units 131 and 141 are fed into resolver unit 151 and therein are resolved into polar coordinates. One output of unit 151 is representative of distance-to-go to the target and the other output is the angle of the target with respect to the interceptor.

The outputs from previously mentioned differential units 91 and 81 are also fed into resolver unit 161 which provides an output proportional to the actual ground track angle. This output is fed as one input to differential unit 171 which has as a second input the target angle output from resolver 151. Resolver 171 as an output which is proportional to the relative bearing of the target with respect to the interceptor.

At this point it is convenient to describe the manner in which TACAN information is tied to the dead reckoning navigation computer. When the interceptor is within range of a TACAN station the pilot, if he so chooses, may utilize the TACAN range and bearing information in conjunction with the dead reckoning navigation system for the purpose of determining more accurately the range and bearing to a target. An aircraft utilizing dead reckoning navigation equipment to a target may deviate from the true course to the target unbeknownst to the pilot as a result of later variations of wind speed and wind direction which are impossible to be taken into account when dead reckoning navigation information is initially inserted. The dead reckoning navigation computer 11 of this invention utilizes a TACAN tie-in for correcting or taking into account this error.

Information giving slant range and bearing to a TACAN base is picked up by receiver 25 which has an output proportional to TACAN slant distance and bearing to the TACAN base. The output proportional to slant range is fed as an input to resolver 16 along with a second input proportional to altitude of the interceptor received from air data computer 45. Utilizing two sides of the triangle resolver 16 provides an output proportional to the horizontal range of the interceptor to the TACAN base. This output proportional to the horizontal range from the interceptor to the TACAN base serves as one input to resolver 26. Resolver 26 has a second input received directly from receiver 25 and which is the output $\beta$ proportional to the TACAN bearing. The outputs from resolver 26 are the distance flown TACAN in the N—S direction and in the E—W direction.

Taking the distance flown TACAN in an E—W direction it is seen that this component serves as one input to differential unit 181. The dead reckoning computation for distance flown in E—W direction which is the output of differential unit 81 serves as one input to differential unit 191. The output of differential unit 191 is fed back as an input to differential unit 181 where it is compared with the distance flown TACAN in E—W direction. Any difference between the two inputs of unit 181 results in an error output from differential unit 181 which also serves as an input to differential unit 191. As a result, differential unit 191 has an output which is proportional to the distance flow in the E—W direction with the added feature that deviation from course due to variations in wind speed and direction is taken into account. The distance flown TACAN in a N—S direction is compared to the dead reckoning distance flow in N—S direction in the same way in differential units 201 and 211. Therefore, the final output from differential unit 211 is proportional to the distance flown in a N—S direction with the deviation from course due to variations in wind speed and direction taken into account. In the event that the TACAN information is not available the dead reckoning computer 11 operates in the normal manner. In this case the error inputs to differential units 191, 211 are zero.

Figure 2:
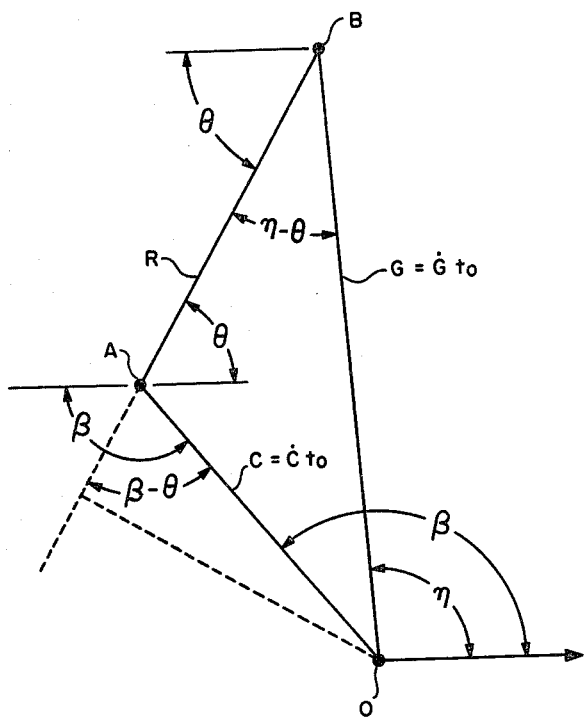
FIGURE 2 illustrates the geometry involved in the solution of the point of interception.

Referring now to FIGS. 1 and 2, the intercept computer 13 receives inputs from data link receiver 35 giving information of the moving target referenced to true north. This information is picked up from a tracking and transmitting station on the ground by receiver 35 and fed as inputs to the intercept computer 13 in form of $x$, $y$ coordinates based on earth coordinates. Resolver 23 receives inputs proportional to $\Delta x$ and $\Delta y$ which are the rectangular coordinates of the target distance from the interceptor referenced to true north. Resolver 23 transforms the $\Delta x$, $\Delta y$ coordinates of position into polar coordinates and has outputs proportional to range R and the angle $\theta$. The range R is the instantaneous distance between the interceptor B and the moving target A and the angle $\theta$ is the instantaneous angle A to B. Resolver 33 receives inputs $\dot{x}$, $\dot{y}$ which are the rectangular coordinates of the target's ground velocity referenced to true north. Resolver 33 transforms these voltages into polar coordinates and resolver 33 has one output proportional to speed $\dot{C}$ of the target A and a second output proportional to target heading.

The range R is fed directly to the display system as will be discussed more fully hereinbelow. The output proportional to the target heading $\beta$ serves as one input to differential unit 43. The second input to differential unit 43 is the output proportional to the angle $\theta$ or target heading. The output of differential unit 43 is proportional to the quantity $\theta-\beta$ and is one input to resolver unit 53. The output from resolver unit 33 proportional to the instantaneous speed $\dot{C}$ of the target serves as a second input to resolver unit 53. Resolver 53 functions to provide two outputs which are proportional to the instantaneous target velocity in the X direction and the instantaneous target velocity in the Y direction. The output from resolver 23 proportional to the angle $\theta$ serves as one input to the differential unit 63. The output of differential unit 63, which is proportional to the quantity $\theta-\eta$ where $\eta$ is the angle at which the interceptor must fly to intercept the target serves as one input to resolver unit 73. A second input to resolver unit 73 is the output from the angle of attack computer 12 which is proportional to the interceptor speed G. The outputs of resolver unit 73 are proportional to interceptor speed in the X direction and interceptor speed in the Y direction. The output from resolver unit 53 proportional to the target velocity in the Y direction serves as one input to differential unit 83 which has as a second input the output from resolver unit 73 proportional to the interceptor velocity in the Y direction. Differential unit 83 has an output, therefore, proportional to $\eta$ which is the angle at which the interceptor must fly in order to reach the calculated point of interception. This output proportional to $\eta$ is fed directly to the command computer as will be more fully discussed hereinbelow. This output further serves as the second input to differential unit 63 where it is subtracted from the angle $\theta$ to result in the output proportional to $\theta-\eta$ as previously discussed.

The output from resolver unit 53 proportional to the target velocity in the X direction serves as one input to differential unit 93 which has, as a second input, the output of resolver unit 73 which is proportional to the interceptor speed with respect to the X direction. The output from differential unit 93 is proportional to the quantity $$\frac{R}{t_0}$$

where R is the instantaneous distance between target and interceptor as seen in FIG. 2 and $t_0$ is the time to go to interception. This output from differentail unit 93 is fed as an input into resolver unit 103 where the quantity $$\frac{R}{t_0}$$

is inverted and multiplied by the range R which is the second input to resolver 103. Resolver 103, therefore, has an output proportional to $t_0$ or time to go to interception. This output is fed directly to display unit as will be more fully discussed hereinbelow.

The output proportional to $t_0$ is fed as an input to resolver unit 113 which has a second input $\Delta H$ from differential unit 17 which is proportional to the difference in altitude between the target and the interceptor. As may be seen from the drawing, differential unit 17 receives as one input the altitude of the target from receiver 35 and a second input which is the altitude of the interceptor from air data computer 45. The output $\dot{H}$ of resolver unit 113 is proportional to the vertical speed at which the interceptor must fly to reach the point of interception.

This output proportional to $\dot{H}$ is made available as an input to the command computer 14 as will be discussed more fully hereinbelow.

The command computer 14 which is continuously operative during all of the flight modes will now be discussed. The purpose of the command computer is to provide command indications whereby the pilot receives the proper commands to enable him to reach a fixed target as in the dead reckoning navigation mode or to reach a point of interception with a moving target as in the case of the intercept mode utilizing the intercept computer outputs.

Depending on the position of switch $S_3$, command computer 14 receives one input to differential unit 24 proportional to the heading which the interceptor must maintain in order to reach the target. The second input to differential unit 24 is proportional to the actual control movement by pilot by which the pilot changes heading. This input may be supplied to differential unit through a quickening circuit 34. Quickening circuit 34 transforms control movements of the stick into a voltage which through a servo system operates the external control elements of the aircraft. The output of differential 24 is proportional to any deviation between actual heading as put in by the pilot and the heading necessary to reach the target, be it fixed or moving. The output from differential unit 24 serves as one input to differential unit 44 which receives a second input from the $V-N$ limit computer 94 as disclosed in application Serial No. 824,750 filed July 2, 1959, and which will be discussed and described here in terms of its broad function.

The purpose of the $V-N$ limit computer 94 is to insure that the normal G forces to which the interceptor may be safely subjected are not exceeded. If the actual normal force exceeds the allowable computed normal force on the aircraft the output of $V-N$ limit computer which serves as the second input to differential unit 44 is such as to effectively instruct the pilot to lessen the G force on the aircraft.

The angle of attack computer 12 which provides an output proportional to the angle of attack $\alpha a$ of the interceptor supplies this output as an input to command computer 14 where it is combined in the quickening circuit 54 with actual pitch control input inserted by the pilot. The quickening circuit 54 aside from lessening the physical exertion required by the pilot to change the pitch of the aircraft also has means for combining algebraically these two inputs to provide an output representative of a pitch stick command corrected for the instantaneous angle of attack of the interceptor. The output from quickening circuit 54 provides one input to differential 64 which has a second input proportional to the vertical speed which is necessary for the interceptor to reach the target. The output of differential 64 provides one input to differential 74 which has a second input from the $V-N$ limit computer which effectively instructs the pilot to remain within the G forces for which the interceptor was designed. Differential unit 74 has an output which causes the display system to indicate the pitch which the pilot must maintain to reach the target.

The manner in which the system is tied together is best described by discussion of the display system, the various inputs thereto, and the switching arrangements associated therewith.

The CC-1 indicator more fully disclosed in application Serial No. 824,749 of Louis S. Guarino for Command Limiter, filed July 2, 1959, now U.S. Patent No. 3,050,710, comprises elements 60 and 70 and is the chief display instrument for this system. The two elements 60 and 70 together present nine separate pieces of command and situation information which the pilot may observe without unduly changing the position of his gaze upon the instrument panel.

The globe 18 receives roll and pitch inputs from gyro platform 15 which energize servo motors to rotate the globe 18 about two axes of rotation to indicate the actual attitude of the aircraft. The actual manner in which the roll and pitch outputs from gyro platform 15 are transformed into mechanical motion forms no part of this invention and will not be discussed. The signal proportional to roll of the aircraft causes the globe to rotate about a vertical axis through the center and gives visual information representative of the roll attitude of the aircraft. Likewise, a signal proportional to pitch causes the globe 18 to rotate about a horizontal axis through the center of the globe to give visual information as to the actual pitch of the aircraft. The heading signal from gyro platform 15 is supplied to and by appropriate servo means causes the outer ring 48 to indicate the actual heading of the aircraft. Readout mechanism or register 67 receives information from either the dead reckoning navigation computer 11 or the intercept computer 14 and indicates distance to go to the target. Distance to go information to the display system comes from the dead reckoning navigation computer 11 when the interceptor is on a flight to a fixed target, in which case the switch $S_2$ will be in the position shown. When the switch $S_2$ is in the position opposite that shown, readout mechanism 67 receives distance-to-go to target information from the intercept computer 13.

The compass ring 58 indicates instantaneous relative bearing of the target with respect to the interceptor. When switch $S_1$ is in the position shown, compass ring 58 receives relative bearing information from the dead reckoning navigation computer 11 which is in operation when the interceptor is on a misson to a fixed target. On the other hand, when the system is in the intercept mode, in which case the intercept computer 13 is in operation instead of the dead reckoning navigation computer 11, the switch $S_1$ will be in a position opposite from that shown. The switch $S_1$ may be operated from the instrument panel in any convenient switching arrangement. The above discussed indicators of elements 60 and 70 display situation. Additionally, elements 60 and 70 also have incorporated therein indicators for command displays to the pilot.

Cross pointer 38 which gives command heading information to the pilot, is caused to deviate from center by the output from differential unit 44 of command computer 14. Such deviation from center instructs the pilot to change heading via the roll stick and pedal to the extent necessary to recenter cross pointer 38. When cross pointer 38 is recentered, it informs the pilot that the interceptor is on the proper heading to the target. The output from differential unit 44 of command computer 14 may be converted to mechanical motion via a servo motor of which element 38a is symbolic.

Cross pointer 28 is caused to deviate from center by an output from the differential unit 74 of command computer 14. Upon deviation of cross pointers 28 from center, the pilot is instructed to change the pitch to recenter the cross pointer 28. When the cross pointer 28 is recentered, the pilot is informed that the interceptor has the correct pitch to reach the target. The output from differential unit 74 of command computer 14 may be converted to mechanical motion via a servo motor of which element 28a is symbolic.

Altitude bug 66 is caused to deviate from a reference position by an input proportional to difference in altitude between the interceptor and moving target when switch $S_8$ is on the intercept contact and the intercept mode of operation is in effect. When switch $S_8$ is in the position shown, altitude bug 66 receives the output of differential unit 56 which is representative of difference of the interceptor's altitude from a desired altitude.

As previously mentioned, the switch $S_3$ connecting the differential unit 24 of command computer 14 to the heading to hold information, may be connected to either the intercept computer 13 as in the case when the interceptor is on an intercept mission to a moving target, or connected to the relative bearing output of the dead reckoning navigation computer 11 in which case the interceptor is on a mission to a fixed target.

A vertical speed input is fed into one side of differential unit 64. This input is also selectable in accordance with the particular mode in which the interceptor is flying. When the switch $S_4$ is on the contact labeled intercept, the input to command computer 14 comes directly from intercept computer 13. When switch $S_4$ is in the position shown, the vertical speed input is provided in a conventional manner.

A vertical speed at which it is desired to fly the aircraft is inserted in differential 36 via knob 46. The second input to differential unit 36 comes from angle of attack computer 12. This input is the output of differentiator 22 and is proportional to the actual vertical speed of the interceptor. The output of differential unit 36 is therefore the change in vertical speed necessary for the interceptor to reach the desired vertical speed as put in by knob 46. As can be seen from the figure, switch $S_4$ has a third position directly below the position in which the switch $S_4$ is shown. For this position the vertical speed input to command computer 14 becomes zero as a predetermined altitude is reached.

A desired altitude is inserted via knob 57 in one side of differential unit 56 which receives a second input proportional to altitude of the interceptor from air data computer 45. Differential unit 56 has an output proportional to deviation of actual altitude from desired altitude which serves as one input to differential unit 37. Unit 37 receives vertical speed difference from differential unit 36 as a second input. Differential unit 37 provides the vertical speed monitored altitude as an input for command computer 14.

Meter 29 is a dual function situation display meter. Servo motor 19 which is connected to turn pointer 39 for displaying angular information on meter 29 may receive an input from any one of three circuits depending on the position of switch $S_5$. The position of switch $S_5$ in turn depends on the particular flight mode in which the interceptor is flying. When switch $S_5$ is in the position shown, the pointer 39 is caused to indicate radio bearing to a ground station since the switch $S_5$ is connected directly to the direction finder equipment ARA-25 which has an output proportional to radio bearing to a ground station. This particular switch position may be used in conjunction with dead reckoning navigation operation when the interceptor is flying to a fixed target.

When switch $S_5$ is on the intercept contact directly above the position shown in FIG. 1, the pointer 39 is caused to indicate an angle β which is the target heading. This angle previously described is obtained directly from resolver 33 of intercept computer 13. Obviously switch S₅ is on the intercept contact when the interceptor is in the intercept mode.

Switch S₅ has a third position which connects the servo motor 19 to the output of TACAN receiver 25 which is proportional to the TACAN bearing and in which case the pointer 39 indicates the bearing to a TACAN station. When the switch S₅ is on a TACAN bearing output contact, the interceptor may be referred to as being in a TACAN mode of operation.

Thus, it may be seen that the pointer 39, according to the mode of operation of the interceptor, displays three unique pieces of information Meter 29 has on its face a readout mechanism or register 49 driven by suitable means, not shown, and depending on the mode of operation of the interceptor, indicates speed of the target in the intercept mode or slant distance to a TACAN station. Thus, when switch S₆ is in the position shown, it connects the output of resolver unit 33 of intercept computer 13 which carries target speed information directly to the meter 29. In addition, when the interceptor is flying in the so-called TACAN mode, the switch S₆ is in the position opposite from that shown and the information fed to display meter 29 comes directly from the TACAN receiver 25 and indicates on register 49 the TACAN distance or slant range to a TACAN base.

As previously discussed, the chief output of angle of attack computer 12 is a voltage proportional to the angle of attack of the interceptor relative to aircraft coordinates. This output is fed directly to meter 75 where it energizes suitable servo means indicated by reference numeral 85 to visually display the angle of attack of the interceptor. This function is continuous throughout the several modes of operation of this system.

Readout mechanism or register 95 is connected directly to intercept computer 13 from which it receives the output of resolver unit 103. This output which is proportional to $t_0$ or time to go to the point of interception causes register 95 to indicate time to go to the point of interception.

Meter 105 is a command display whereby the pilot is instructed to maintain a desired speed. When switch S₇ is in the position shown, the servo motor 115 is driven directly by a command speed output from receiver 35 based on relative motion of the target. Thus, the pointer upon deviation from the command speed moves left or right and the pilot is instructed to decrease or increase speed until the pointer 125 is again centered and at which time the pilot is informed that he is flying at the proper speed. It is pointed out that the command speed display functions to insure that interceptor speed is within certain limits and is not critical to the functioning of the system. When switch S₇ is in the position opposite from that shown, the servo motor 115 receives the output of differential unit 76. Differential unit 76 has one manual input via knob 86 of the desired Mach number at which the interceptor is to fly. Differential unit 76 has a second input from air data computer 45 which is proportional to the actual Mach of the interceptor. The output of differential unit 76 is the difference or deviation of the actual Mach of the interceptor from the reference manually inserted Mach previously mentioned.

Altimeter 135 indicates barometric altitude or altitude measured by Doppler radar or a combination of both as more fully disclosed in application Serial No. 861,155 of Stephen J. Sikora for Barometric-Radar Altitude Indicating System, filed December 21, 1959. Servo motor 125 receives the output of differential 96 to cause the pointer of altimeter 135 to indicate altitude. Differential 96 has one input from Doppler radar unit 55 and a second input from air data computer 45 which is proportional to the altitude of the interceptor.

It should be understood that the display elements as discussed in actual practice occupy a small area of a control panel to enable the pilot to see readily all the command and situation displays. It should also be noted that elements 60 and 70 in reality form one indicator with readout mechanism 95 located nearby.

It is further pointed out that switches S₁ through S₈ may be operated automatically or manually by the pilot who determines the mode in which to fly according to the tactical environment.

It should be understood, of course, that the foregoing disclosure relates to only a preferred embodiment of the invention and that numerous modifications or alterations may be made therein without departing from the spirit and scope of the invention as set forth in the appended claims.

What is claimed is:

1. An integrated computer-display system for use in an interceptor aircraft flying to a fixed target or to a point of interception with a moving target, comprising in combination: a dead reckoning navigation computer, input means providing said dead reckoning navigation computer with inputs proportional to wind velocity, target position, interceptor heading, and interceptor speed, said dead reckoning navigation computer having output means providing a first output proportional to relative bearing of the target with respect to the interceptor and a second output proportional to interceptor distance to go to the target; an intercept computer, input means providing said intercept computer with inputs proportional to target velocity, target position, and interceptor speed, said intercept computer having output means providing a first output proportional to instantaneous interceptor distance to the moving target, and a second output proportional to the instantaneous relative bearing of the target with respect to the interceptor; display means for indicating relative bearing and distance to go to target; and selective switch means for connecting respective outputs of said dead reckoning navigation computer or said intercept computer to said display means.

2. An integrated computer-display system for use in an interceptor aircraft flying to a fixed target or to a point of interception with a moving target, comprising in combination: gyro means having an output proportional to interceptor heading; first means providing an output proportional to angle of attack of the interceptor; second means providing an output proportional to interceptor speed; a dead reckoning navigation computer, manual means providing said dead reckoning navigation computer with inputs proportional to a fixed target position and wind velocity, first connecting means connecting said dead reckoning navigation computer to said gyro means to receive as an input said gyro means output, second connecting means connecting said first means to said dead reckoning navigation computer to receive as an input said first means output, said dead reckoning navigation computer including output means providing a first output proportional to relative bearing of the fixed target with respect to the interceptor and a second output proportional to interceptor distance to the fixed target; an intercept computer, input means providing said intercept computer with inputs proportional to the moving target position, target velocity, and difference in altitude between the moving target and the interceptor, third connecting means connecting said second means to said intercept computer to receive as an input said second means output, said intercept computer including output means providing a first output proportional to instantaneous interceptor distance to the moving target, a second output proportional to the instantaneous relative bearing of the moving target with respect to the interceptor; display means for indicating relative bearing and distance to a target; selective switch means for connecting respective outputs of said dead reckoning navigation computer or said intercept computer to said display means whereby said display means indicates relative bearing and distance to go to a fixed or moving target.

3. An integrated computer-display system for use in an interceptor aircraft flying to a fixed target or to a point of interception with a moving target, comprising in combination: a dead reckoning navigation computer, input means providing said dead reckoning navigation computer with inputs proportional to wind velocity, target position, interceptor heading, and interceptor speed, said dead reckoning navigation computer having output means providing a first output proportional to relative bearing of a fixed target with respect to the interceptor and a second output proportional to interceptor distance to the fixed target; an intercept computer, input means providing said intercept computer with inputs proportional to target velocity, target position, and interceptor speed, said intercept computer having output means providing a first output proportional to instantaneous interceptor distance to the moving target, a second output proportional to the instantaneous relative bearing of the moving target with respect to the interceptor, a third output proportional to target heading, and a fourth output proportional to target speed; first display means connected to said intercept computer to receive said outputs proportional to target speed and heading for indicating said target speed and heading; second display means for indicating relative bearing and distance to a target; selective switch means for connecting respective outputs of said dead reckoning navigation computer or said intercept computer proportional to relative bearing or distance to a target to said display means whereby relative bearing and distance to a fixed or moving target is indicated.

4. An integrated computer-display system for use in an interceptor flying to a fixed target or to a point of interception with a moving target, comprising in combination: a dead reckoning navigation computer, input means providing said dead reckoning navigation computer with inputs proportional to wind velocity, target position, interceptor heading, and interceptor speed, said dead reckoning navigation computer having output means providing a first output proportional to relative bearing of the fixed target with respect to the interceptor and a second output proportional to intercepor distance to the fixed target; an intercept computer, input means providing said intercept computer with inputs proportional to target velocity, target position, interceptor speed, and difference in altitude between the moving target and interceptor, said intercept computer having output means providing a first output proportional to heading to hold to intercept the moving target, and a second output proportional to vertical velocity to maintain to intercept the moving target; means operative to provide an output proportional to a desired vertical velocity, angle of attack computer means providing an output proportional to angle of attack of the interceptor; a command computer, means providing said angle of attack output as an input to said command computer; first switch means for selectively connecting the outputs of said dead reckoning navigation computer or said intercept computer which are respectively proportional to relative bearing of the interceptor with respect to the fixed target and heading to hold to intercept the moving target to said command computer; second switch means for selectively connecting the outputs of said desired vertical speed means or said intercept computer which are respectively proportional to said desired vertical speed and said interceptor vertical speed to maintain to intercept the moving target to said command computer; said command computer having output means providing a first output proportional to command heading and a second output proportional to command pitch; display means connected to said command computer to receive said outputs proportional to command heading and command pitch whereby the command heading and command pitch necessary to reach a fixed or moving target are indicated.

5. An integrated computer-display system for use in an interceptor flying to a fixed target or to a point of interception with a moving target, comprising in combination: a dead reckoning navigation computer, input means providing said dead reckoning navigation computer with inputs proportional to wind velocity, target position, interceptor heading, and interceptor speed, said dead reckoning navigation computer having output means providing a first output proportional to relative bearing of a fixed target with respect to the interceptor and a second output proportional to interceptor distance to the fixed target; an intercept computer, input means providing said intercept computer with inputs proportional to target velocity, target position, interceptor speed, and difference in altitude between the moving target and the interceptor, said intercept computer having output means providing a first output proportional to heading to hold to intercept the moving target, a second output proportional to vertical velocity to maintain to intercept the moving target, a third output proportional to the relative bearing of the moving target with respect to the interceptor, and a fourth output proportional to the interceptor distance to the moving target; means operative to provide an output proportional to a desired vertical velocity, angle of attack computer means providing an output proportional to angle of attack of the interceptor; a command computer, means providing said angle of attack output as an input to said command computer, first switch means for selectively connecting the outputs of said dead reckoning navigation computer or said intercept computer which are respectively proportional to relative bearing of the interceptor with respect to the fixed target and heading to hold to intercept the moving target to said command computer, second switch means for selectively connecting the outputs of said desired vertical speed means or said intercept computer which are respectively proportional to said desired vertical speed and said interceptor vertical speed to maintain to intercept the moving target to said command computer, said command computer having output means providing a first output proportional to command heading and a second output proportional to command pitch; first display means for indicating relative bearing and distance to a target; third switch means for selectively connecting the outputs of said dead reckoning navigation computer or said intercept computer which are proportional to relative bearing of a target with respect to the interceptor to said first display means; fourth switch means for selectively connecting the outputs of said dead reckoning navigation computer or said intercept computer which are proportional to the distance to a target to said first display means; second display means connected to said command computer to receive said outputs proportional to command heading and command pitch whereby command heading and command pitch necessary to reach a fixed or moving target are indicated.

6. An integrated computer-display system for use in an interceptor aircraft flying to a fixed target or to a point of interception with a moving target, comprising in combination: gyro means providing an output proportional to interceptor heading; angle of attack computer means providing an output proportional to angle of attack of the interceptor; first means providing an output proportional to interceptor speed; a dead reckoning navigation computer, manual means for providing said dead reckoning navigation computer with inputs proportional to a fixed target position and wind velocity, first connecting means connecting said dead reckoning navigation computer to said gyro means to receive said gyro means output as an input, second connecting means connecting said dead reckoning navigation computer to said first means to receive said output proportional to interceptor speed as an input, said dead reckoning navigation computer including output means providing a first output proportional to relative bearing of the fixed target with respect to the interceptor and a second output proportional to interceptor distance to the fixed target; an intercept computer, input means providing said intercept computer with inputs proportional to moving target position, target velocity, and difference in altitude between the moving target and the interceptor, third connecting means connecting said intercept computer to said first means to receive said first means output as an input, said intercept computer including output means providing a first output proportional to instantaneous interceptor distance to the moving target, a second output proportional to the instantaneous relative bearing of the moving target with respect to the interceptor, a third output proportional to heading to hold to intercept the moving target, and a fourth output proportional to vertical velocity to maintain to intercept the moving target; means operative to provide an output proportional to a desired vertical velocity; a command computer, means connecting said command computer to said angle of attack computer means to provide said angle of attack output as an input to said command computer, first switch means for selectively connecting the outputs of said dead reckoning navigation computer or said intercept computer which are respectively proportional to relative bearing of the interceptor with respect to the fixed target and heading to hold to intercept the moving target to said command computer, second switch means for selectively connecting the outputs of said desired vertical speed means or said intercept computer which are respectively proportional to said desired vertical speed and said interceptor vertical speed to maintain to intercept the moving target to said command computer, said command computer having output means providing a first output proportional to command heading and a second output proportional to command pitch; first display means for indicating relative bearing and distance to a target; third switch means for selectively connecting the outputs of said dead reckoning navigation computer or said intercept computer which are proportional to relative bearing to a target to said first display means whereby relative bearing to a fixed or moving target is indicated, fourth switch means for selectively connecting the outputs of said dead reckoning navigation computer or said intercept computer which are proportional to distance to a target to said first display means whereby distance to a fixed or moving target is indicated; second display means connected to said command computer to receive said outputs proportional to command heading and command pitch whereby command heading and command pitch necessary to reach a fixed or moving target are indicated.

7. An integrated computer display system for use in an interceptor aircraft flying to a fixed target or to a point of interception with a moving target, comprising in combination: a gyro platform providing outputs proportional to pitch, roll, and heading of the interceptor; an angle of attack computer connected to said gyro platform to receive as inputs said outputs proportional to pitch and roll, means providing said angle of attack computer with an input proportional to altitude of the interceptor, said angle of attack computer including output means providing a first output proportional to interceptor speed and a second output proportional to angle of attack of the interceptor; a dead reckoning navigation computer, input means connected to said dead reckoning navigation computer providing inputs thereto proportional to wind speed, wind direction, target distance, and target bearing, means connecting said dead reckoning navigation computer to said angle of attack computer to provide the output of said angle of attack computer proportional to interceptor speed as an input to said dead reckoning navigation computer, means connecting said dead reckoning navigation computer to said gyro platform to provide the gyro platform output proportional to heading of the interceptor as an input to said dead reckoning navigation computer, said dead reckoning navigation computer including first output means having an output proportional to relative bearing of the target with respect to the interceptor, and second output means having an output proportional to the distance to go to the target; an intercept computer, first input means connected to said intercept computer providing inputs proportional to position and velocity of a moving target reference to true north, means connecting said intercept computer to said angle of attack computer output means to provide an input to said intercept computer proportional to interceptor speed, second input means connected to said intercept computer providing an input proportional to the difference in altitude between said interceptor and said moving target, said intercept computer including first output means providing an output proportional to the instantaneous distance between said interceptor and said moving target, second output means providing an output proportional to the relative bearing of the target with respect to the intercepter, third output means providing an output proportional to target speed, fourth output means providing an output proportional to target heading, fifth output means providing an output proportional to interceptor heading to hold to intercept said moving target, sixth output means proportional to time to go to intercept, and seventh output means providing an output proportional to the vertical speed necessary for the interceptor to intercept said moving target; a command computer, first switch means selectively connecting said command computer to said dead reckoning navigation computer or to said intercept computer to respectively provide an input thereto proportional to relative bearing of a fixed target or heading to hold to intercept a moving target, means providing an output proportional to a predetermined vertical speed; switch means selectively connecting said command computer to said intercept computer seventh output to said predetermined vertical speed means to provide an input to said command computer proportional to said vertical speed necessary for the interceptor to intercept said moving target or proportional to said predetermined vertical speed, means connecting said command computer to said angle of attack computer to provide said angle of attack computer output proportional to angle of attack as an input to said command computer, said command computer including first output means providing an output proportional to command heading and second output means providing an output proportional to command pitch; first display means, means connecting said command computer output proportional to command heading to said first display means to indicate command heading to the pilot, means connecting said command computer output proportional to command pitch to said first display means to indicate command pitch to the pilot, means connecting said gyro platform outputs to said first display means to indicate roll, pitch, and heading of the interceptor, third switch means selectively connecting the respective relative bearing outputs of said dead reckoning navigation computer or said intercept computer to said first display means to indicate relative bearing of the interceptor with respect to the target, fourth selector switch means connecting respective interceptor distance to target outputs of said dead reckoning navigation computer or said intercept computer to said first display means to indicate interceptor distance to the target; second display means, means connecting said second display means to said intercept computer outputs proportional to target heading, target speed, and time to go to intercept to indicate target heading, target speed, and time to go to intercept; third display means connected to said angle of attack computer output proportional to angle of attack of the interceptor to indicate angle of attack of the interceptor.

8. In an integrated computer-display system for use in an interceptor flying to a target; a dead reckoning navigation computer, manual means for providing inputs to said dead reckoning navigation computer proportional to wind speed, wind direction, target distance, and target bearing, input means providing said dead reckoning navigation computer with a first input proportional to interceptor heading and a second input proportional to interceptor speed, said dead reckoning navigation computer including computer means providing an output proportional to distance flown by the interceptor, TACAN receiver means providing an output proportional to distance flown by the interceptor referenced to a ground station, compensating means included in said dead reckoning navigation computer connected to receive said outputs of said computer means and said TACAN receiver means as inputs and providing an output proportional to interceptor distance flown adjusted for variation in wind velocity.

9. In an integrated computer-display system for use in an interceptor flying to a target; an intercept computer, comprising in combination: a first resolver, first input means providing said first resolver with inputs proportional to target position relative to the interceptor in the $x, y$ directions, said first resolver including output means providing a first output proportional to instantaneous interceptor distance to the target and a second output proportional to instantaneous relative bearing of the target with respect to the intercepor, a second resolver, second input means providing said second resolver with inputs proportional to target velocity relative to the interceptor in the $x, y$ directions, said second resolver including output means providing a first output proportional to target speed and a second output proportional to target heading, computer means connected to receive said outputs of said first and second resolvers proportional to target heading, target speed and relative bearing of the target with respect to the interceptor, third input means providing said computer means with an input proportional to interceptor speed, said computer means including first output means providing an output proportional to heading to hold to intercept the target and second output means providing an output proportional to the time rate of change of the distance between the target and the interceptor, divider means connected to said second output means and to said first resolver output means to receive said outputs proportional to time rate of change of the distance between the target and the interceptor and the instantaneous distance between the target and the interceptor, said divider means including output means providing an output proportional to time to go to interception of the target.

No references cited.